July 14, 1942.  L. B. GREEN  2,289,356
RECORD CHANGING PHONOGRAPH MECHANISM
Filed March 27, 1940 4 Sheets-Sheet 1

INVENTOR,
Lee B. Green
BY Frank M. Slough
ATTORNEY.

July 14, 1942.  L. B. GREEN  2,289,356
RECORD CHANGING PHONOGRAPH MECHANISM
Filed March 27, 1940  4 Sheets-Sheet 2

INVENTOR,
Lee B. Green
BY Frank M. Slough
ATTORNEY.

July 14, 1942.  L. B. GREEN  2,289,356
RECORD CHANGING PHONOGRAPH MECHANISM
Filed March 27, 1940   4 Sheets-Sheet 3

Lee B. Green INVENTOR
BY Frank J. W. Slough
ATTORNEY.

July 14, 1942.  L. B. GREEN  2,289,356
RECORD CHANGING PHONOGRAPH MECHANISM
Filed March 27, 1940  4 Sheets-Sheet 4

Lee B. Green, INVENTOR.
BY Frank M. Slough
ATTORNEY.

Patented July 14, 1942

2,289,356

UNITED STATES PATENT OFFICE 2,289,356

RECORD CHANGING PHONOGRAPH MECHANISM

Lee B. Green, Lakewood, Ohio, assignor to The General Industries Company, Elyria, Ohio, a corporation of Ohio Application March 27, 1940, Serial No. 326,195

9 Claims. (Cl. 274—10)

My invention relates to record changing mechanisms for phonographs, and relates more particularly to record changing mechanisms of the general type wherein a stack of records, normally supported above a phonograph turntable, are automatically lowered, one at a time, onto the uppermost surface of the turntable, or onto the uppermost surface of any uppermost records at the time disposed on the turntable, for reproduction by the phonograph reproducer adapted to traverse and reproduce the records during the playing thereof.

It is an object of my invention to provide an improved mechanism of the above type which may be economically manufactured, and which is of sturdy and reliable construction, and which will operate over long periods for a great number of operations, without the necessity of readjustment of any of the parts.

Another object of my invention is to provide an improved mechanism of the above type, wherein improved record supporting and lowering means is provided to more reliably lower one of the records of a stack of records supported thereby, and without the liability of damage to records of the supported stack even though these may vary slightly in diameters and in edge portion thicknesses, and in the form of the edges.

Another object of my invention is to provide improved supporting and record discharging means, as set forth in the previous object, wherein a plurality of said supporting means may cooperatively support a stack of records and lower one of said records at a time, as desired, in sequence.

Another object of my invention is to provide an improved mechanism achieving the aforesaid objects, and wherein said plurality of record supporting and discharging means may be readily and quickly correspondingly adjusted by an operator to accommodate records of different standard sizes.

Another object of my invention is to provide an improved mechanism achieving the aforesaid objects, and wherein said plurality of record supporting and discharging means may be readily and quickly correspondingly adjusted by an operator to accommodate records of different standard sizes, and whereby, by operation of said improved adjusting mechanism, said plurality of record supporting and record discharging means may be selectively adjusted for records of different sizes in such manner that each will, with respect to the diameter of records corresponding to any of said adjusted positions, occupy the same relative lateral position.

Another object of my invention is to provide improved adjustment mechanism, as set forth in the preceding object, wherein the preceding object is achieved and wherein records supported by said selectively adjusted record supporting means are discharged to the turntable by rotative movements of the supporting means wherein said adjusting mechanism for each adjustment, will present said supporting means to the sides of records of the sizes for each adjustment, in the same rotative angular position of said supporting means at each operation thereof.

Another object of my invention is to provide, for a record changing mechanism of the above type, improved adjustment means to variably position a rotatable record supporting post which is disposed at the sides of the records to greater or less distances from the axis of rotation of said records to substantially correspond to the variation of radial dimension of different sets of records to be served by the mechanism in the differently adjusted positions of said post, and wherein a rotative movement of said post over a given angle of rotation is effective to release to a turntable, a lowermost record of a reserve stack of records supported above the turntable, and wherein said post prior to that rotative movement which would release the lowermost record of the stack, and in each said adjusted position of the post, has the same radial portion disposed in corresponding alignment with the radius of the turntable which is in the vertical plane of the post axis.

Another object of my invention is to provide, for a record changing mechanism of the above type, improved adjustment means to variably so position a record supporting and discharging post disposed laterally of a record supporting turntable, to greater or less distances from the axis of rotation of said turntable and preserving the same normal alignment with the vertical plane of that radius of the turntable which if laterally projected would include the axis of rotation of said post, with the same radial portion of said post, and at the same time to maintain a constant relative rotative position of said post, so that in all laterally adjusted positions thereof, laterally extending record supporting and discharging elements of said post have the same portions disposed radially of the axis of post rotation in alignment with the vertical plane of the turntable axis which if laterally projected would include the axis of rotation of said post, whereby said supporting and discharging post elements are adapted to move in arcuate paths similarly related to said planes in all post adjustment positions.

Another object of my invention is to provide, for phonograph record changing mechanisms of the type having record supporting means comprising a plurality of sets of arcuately movable blades, each set mounted on a post disposed laterally of the phonograph turntable, and wherein said blades support a stack of superposed disc records above a turntable and upon arcuate movement of the blades to release a lowermost record of the stack to the underlying turntable,— improved adjustment means for said supporting means to position said sets of blades to predetermined varying distances laterally from the axis of the stack of records, and operating in an improved manner to insure that a line extending between the axis of movement of said blades and the stack axis will traverse the vertical plane of the same portion of said record supporting means, in all laterally adjusted positions of said supporting means, thereby insuring the same timed cooperative contact between said blades and stacked records of one size for which said supporting means is pre-adjusted as for another size of records for which said supporting means may be re-adjusted.

Another object of my invention is to provide, in a mechanism of the type described, having arcuately movable record supporting and releasing blades, improved adjustment means for said blades operative when said blades are arcuately moved to release a record of a stack supported above a turntable, said adjustment means adaptable to be adjusted to different lateral positions relative to the axis of said stack and in each position to insure the same timed cooperative contact between said blades and stacked records of one size for which said supporting means is pre-adjusted as for another size of records for which said supporting means may be re-adjusted.

Another object of my invention is to provide, in mechanism achieving the aforesaid objects, improved manually adjustable means for conditioning the phonograph for ordinary manual operation, in an improved manner.

Other objects of my invention and the invention itself will become apparent by reference to the accompanying description and the drawings hereof, illustrating an embodiment of my invention, whereof ancillary cooperative apparatus of one form of apparatus with which my invention may be employed is illustrated in my co-pending application for patent, Serial No. 312,839, filed January 8, 1940, for improvements in Phonograph record changing mechanisms, of which the present application is divisional.

Referring to the drawings hereof.

Referring now to the various figures of drawings, in which like parts are designated by like reference characters, which, incidentally, correspond to reference characters of the drawings of my said co-pending application, for the same parts illustrated and described therein, I show at 10 a mounting plate provided with bolt receiving apertures 11 of the plate, so disposed as to conveniently mount the plate in a phonograph cabinet, there being illustrated a phonograph turntable 20 adapted to support one or more records R, the uppermost of which containing on its upper surface the usual indentured reproducing groove adapted to be traversed by the usual reproducing needle of a phonograph reproducing tone arm 40.

The tone arm 40 is adapted, by means not illustrated herein, to be elevated to lift the needle from the record at the conclusion of the playing of a record, and to be swung outwardly beyond the periphery of the records R, whereupon the lowermost record of the stack of records S may be released by the record releasing or supplying means hereinafter to be described, whereupon the said tone arm is adapted to be moved laterally inwardly and downwardly to again replace the needle on the upper surface of the record in the initial record reproducing groove thereof, in the usual manner.

The means for elevating, lowering, and swinging the tone arm, and the specific means for actuating the lever 100, Fig. 4, which, through the linkage to be hereinafter described, operates the record releasing mechanism, may be of any desired known type, being illustrated herein, however, as being operated by a projection 103 on a periodically rotatable disc 104 for the purpose of showing one way in which the apparatus of the present invention may be suitably operated.

Incidentally, the disc 104 may be operated through a reducing gear mechanism indicated at 27—28, from a friction wheel 22 of the power take-off mechanism, hereinafter described, which is adapted to be peripherally engaged with the inner surface of a depending flange of the turntable 20.

Figures 1, 2, 3:
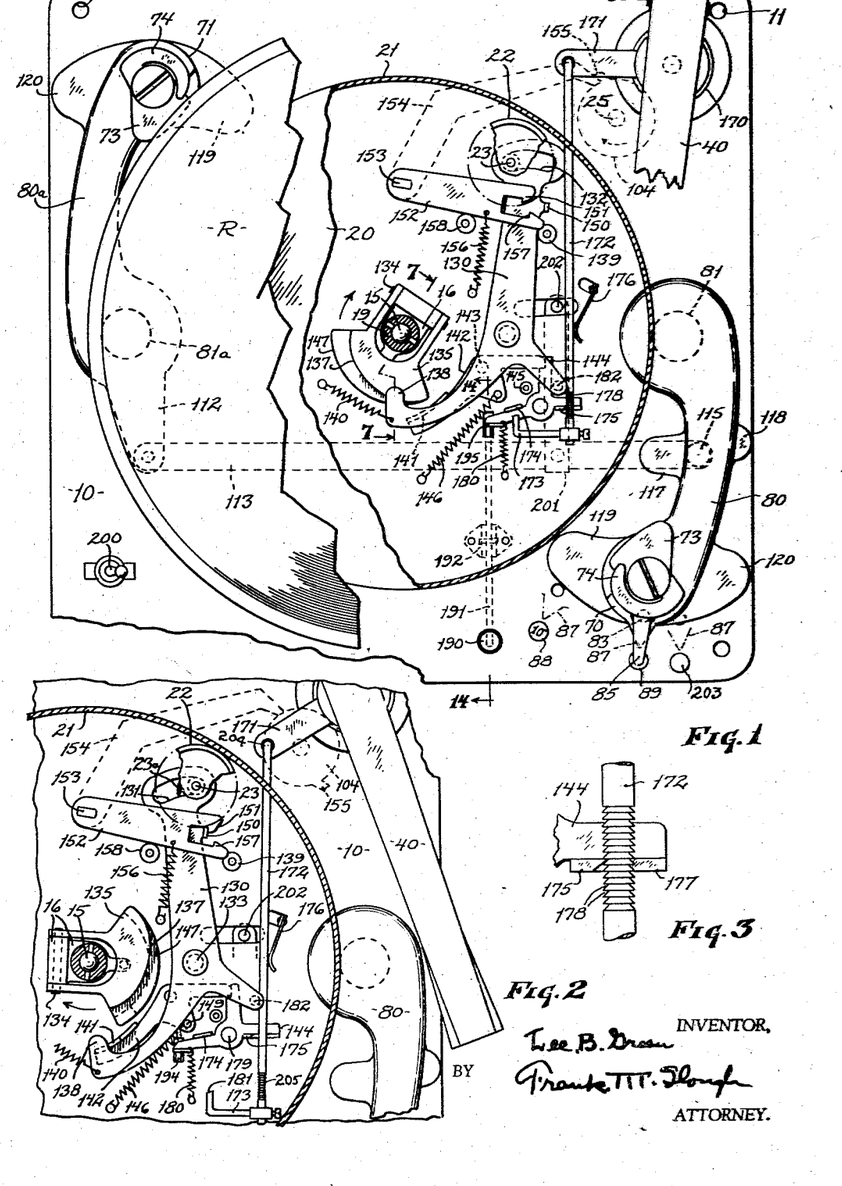
Fig. 1 is a top plan view of a phonograph and record changer unit showing, in top plan, elements of an embodiment of my invention.
Figs. 2 and 3 are views showing a top plan of a record supporting and record discharging element of which a plurality are preferably employed in the illustrated embodiment of my invention, Fig. 2 showing the supporting and discharging element in an initial normal position, and Fig. 3 showing the same elements in fully advanced operated position, relative to the stack of records indicated in said figures.
Figure 4:
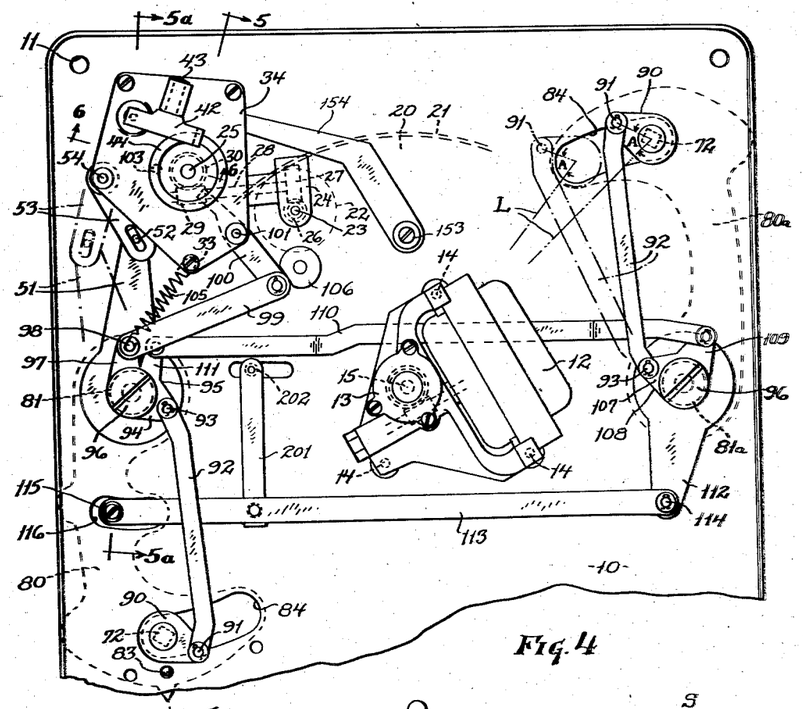
Fig. 4 is a bottom plan view of the said embodiment, together with portions of the associated cooperative parts of a phonograph mechanism with which my invention is adapted to operate.
Figure 5:
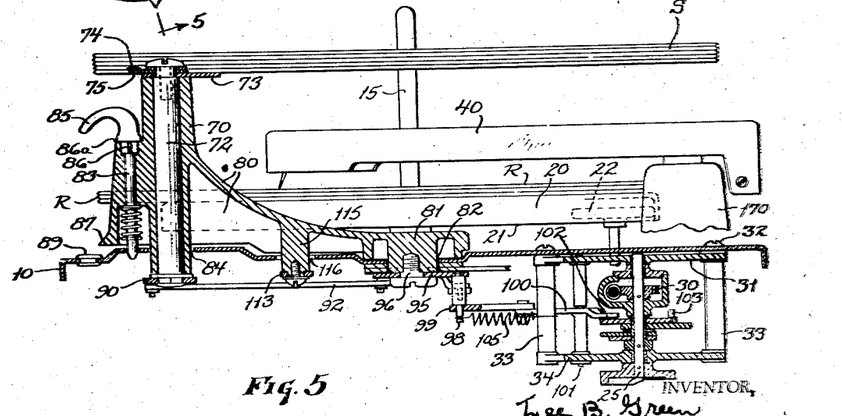
Fig. 5 is a view, partly in vertical section and partly in elevation, of the apparatus of the foregoing figures.

The power take-off at the rim 21 of the turntable drives the mechanisms which lift the tone arm, at the conclusion of a record, swing it off to the side, and return it to the succeeding record, and which drop the succeeding record into place from the stack of S, Fig. 5. As illustrated in Fig. 1, a rubber-tired wheel 22 is adapted to engage the inner surface of the turntable rim and to be rotated by it when so engaged. This wheel 22 is mounted on a spindle 23 which projects through an enlarged opening 23a in the base plate 10, and is carried by a speed reducer housing 24, Figs. 4 and 9. The housing 24 may be oscillated about a shaft 25, and thus the wheel 22 may be swung into and out of engagement with the rim 21, under control of the mechanism concealed beneath the turntable and to be later described.

Figures 5A, 6, 9, 10:
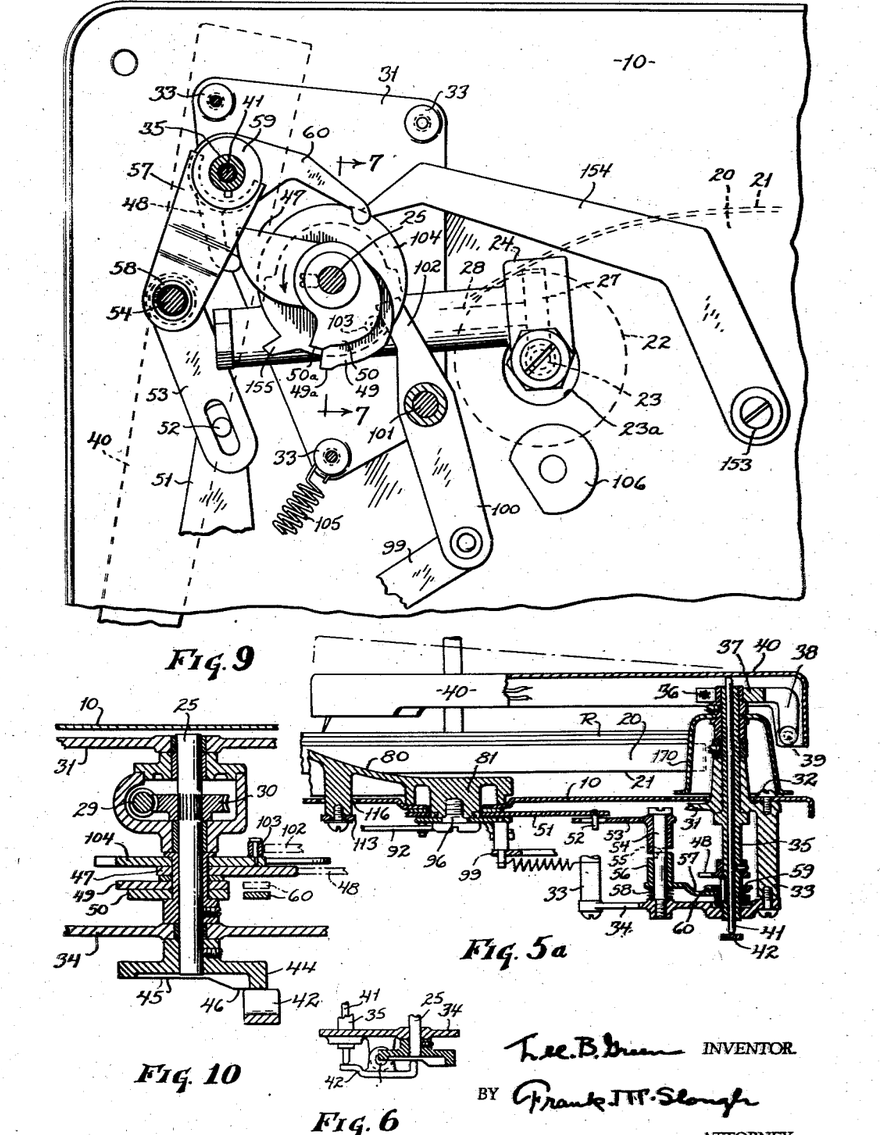
Fig. 5a is a view similar to that of Fig. 5, but illustrating additional elements of apparatus.
Fig. 6 is a vertical section taken on the line 6—6 of Fig. 4.
Fig. 9 is a view similar to a part of Fig. 4, but with the bottom frame plate removed for greater clarity.
Fig. 10 is a section taken on the line 10—10 of Fig. 9, but with certain of the parts rotated into the plane of the section which would not otherwise appear.

Within the housing 24, Fig. 9, the spindle 23 carries a worm 26 driving a worm wheel 27 on a shaft 28. Near its opposite end, illustrated in Fig. 10, the shaft is formed as a worm 29 driving a worm wheel 30 rigid with the shaft 25, before mentioned, which carries the various cams controlling the tone arm and record changes. The upper end of the shaft 25 is rotatably mounted in a plate 31 bolted, as at 32, Fig. 5, beneath the base plate 10. Depending, integral legs 33 of the plate 31 support a lower plate 34 which carries the bearing for the lower end of the shaft 25.

Also journalled in the upper and lower plates is a hollow shaft 35, Figs. 5 and 5a, which projects upwardly through the base plate 10. Clamped to the upper end of the shaft, by means of a bolt 36, is a block 37 having depending ears 38. These ears support the pivot pins 39 of the tone arm 40. The tone arm normally rests on the record, but may be swung upwardly by the upper end of the rod 41, slidable within the hollow shaft 35. The lower end of the rod is engaged by a rocker arm 42 pivoted at 43, Figs. 4 and 6, to the lower plate 34. The rocker arm, in turn, engages a cam wheel 44 drivingly secured to the shaft 25. During normal playing operation of the phonograph, the rocker arm engages a lull 45 of the cam and allows the rod 41 to drop free of the tone arm so that the weight of the latter is carried by the needle on the record in the usual manner. At the conclusion of the record, however, the power take-off is initiated and the cam is revolved, rocking the arm 42 to lift the rod 41, and thereby lifting the tone arm from the record. The tone arm remains elevated due to the lull 46 of the cam, until the operations of swinging it aside and back again, and of record changing, have been completed.

The swinging of the tone arm in an outwardly direction is accomplished by means of a cam 47 rigid with the shaft 25. Pinned to the tone arm shaft 35, Figs. 5, 5a, and 9, is a cam follower 48 which is engaged by the cam 47, immediately after the tone arm has been raised. The cam is so formed as to swing the follower 48, and therefore the tone arm, until the latter is free of the largest record for which the phonograph is adapted, in the present case one of twelve-inch diameter, and by continued rotation to free the follower for subsequent return by other means.

The return of the tone arm to the succeeding record is controlled by either of two cams 49 or 50, depending upon the size of the records being played. The machine of the present invention is adapted to accommodate the two common standard sizes, namely the ten-inch and twelve-inch records, by adjusting the position of the stack supporting posts, as later described. It will suffice at this time merely to say that the position of the post adjacent to the tone arm mechanism rotates an arm 51, Fig. 4, into either of two positions. A pin 52 in this arm is embraced by a slot in an arm 53, the integral hub of which may rotate on a stud 54 fixed to the lower plate 34. The lower face of the hub is formed as a cam 55 which co-acts with a complementary cam on the hub 56 of a fork 57. The fork is slidable on the stud 54 and is urged upwardly, by a spring 58, against the cam 55, the upward movement of the latter being limited by the head of the stud. Thus, when the adjustment is made for a twelve-inch record the arm 51, and therefore the arm 53, are in the full line position of Fig. 4, and the cam 55 forces the fork 57 to its lower position. With conditions set for ten-inch records, the arm 53 will be in the broken line position and the cam will allow the spring to raise the fork to its upper position.

Slidably keyed to the tone arm shaft 35, Figs. 5 and 9, is the hub 59 of a cam follower 60 which may engage either of the cams 49 or 50, rigid with the shaft 25, as determined by the fork 57 which embraces a groove in the hub 59. The follower 60 extends to the opposite side of the shaft 25 from the follower 48, previously described, and hence rotates the shaft 35 and the tone arm to return the latter from its outer position. As seen in Fig. 9, each cam 49 and 50 is so formed as to be free of the follower 60 during most of its revolution but engages it, at the proper time, to rotate it to a point where the tone arm is positioned immediately above the starting groove of the twelve-inch record.

Further revolution of the cam 50 frees the follower entirely, and the tone arm is then lowered to the record, as previously described, and is carried along by the groove in the usual manner during playing. Kick-in humps 50a and 49a give the tone arm an impulse to swing it in the playing direction to insure engagement of the tone arm needle with the playing groove of a record.

Figure 13:
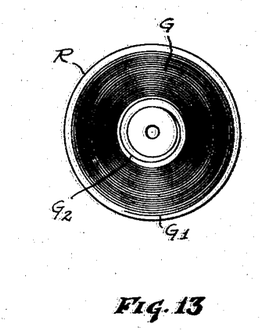
Fig. 13 is a plan view of a record.

When operating with ten-inch records, the tone arm, of course, must be returned a greater distance to reach the starting groove G1, Fig. 13, and therefore the cam 49, at which the follower 60 is positioned in this case, is sufficiently larger than the cam 50 to produce the additional rotation of the follower. In other respects the two cams are alike.

During the interval in which the tone arm remains at its outermost position, a record R is dropped from a previously arranged stack S, Fig. 5, onto the turntable. Of course one or more records may already be on the turntable at this time, but there is more than ample frictional contact between them to drive the uppermost one during the playing operation, and the tone arm 40 is raised sufficiently by the rod 41 to clear an accumulated ten or more.

Figure 11:
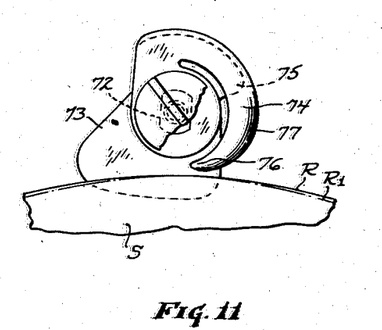
Fig. 11 is an enlarged plan of the record stack supporting unit.

To support the stack of records above the turntable, until such a time as they are to be dropped on the turntable, two posts 70 and 71 are positioned at diametrically opposite corners of the base plate 10, as seen in Fig. 1. Carried within these posts, and rotated by means later described, are shafts 72, Fig. 5. Mounted on the squared upper end of each shaft 72 is a flat, roughly triangular plate 73, the inner edge portion of which is slightly within the periphery of a record, as seen in Figs. 1 and 11, and thus serves a support therefor. Rotation of the shaft, and therefore of the plate, through approximately a quarter of a revolution in a clockwise direction removes this support and the record is free to drop upon the turntable below. To provide a support for the remainder of the stack while releasing the lowermost record, a second plate or blade, 74, is also mounted on the squared end of the shaft 72 and spaced above the first plate, by a third plate 75, a distance equal to the average thickness of a record.

The plate or blade 74 is formed for the greater part as a narrow, curved, detached tongue, the outer edge near the free end 76 being beveled, as at 77 in Fig. 11. The beveled outer edge of the tongue is of arcuate form and the portions relatively near the end 76 are relatively inwardly directed towards the axis of rotation of the plate. By this construction, the blade outer lateral edge makes inter-record making contact rearwardly of the forward edge 76, and the degree of penetration of the blade is gradually progressively increased as the blade 74 is rotated.

The angle A of rotation is so limited that the spacing and blade supporting plate 75 does not reach such position where it would otherwise contact any record of the stack during blade rotation.

Figure 12:
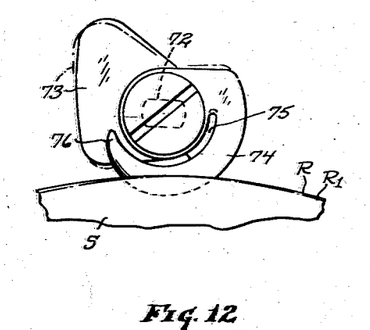
Fig. 12 is a similar view showing the parts of Fig. 11 in a different position.

Flexible because of its form and being, further, made of relatively flexible material such as spring steel, the plate or blade 74 can readily penetrate between the lower two records as the shaft 72 is turned, despite variations in record thickness, and without damage to them. By the time the lower plate 73 is about to allow the bottom record to drop, the tongue has turned sufficiently for the stack to be supported at the relatively stiff region near the underlying spacer plate 75. After the record has been dropped, the parts reaching the position shown in Fig. 12, the shaft is rotated in the opposite direction to return the support to its original position. In doing so the stack rides down the flexible tongue and is gently deposited upon the main supporting plate 73 and is ready for the next cycle.

In the mechanism of the present invention, two sizes of records are to be accommodated and the supporting posts 70 and 71 are therefore so formed as to assume the necessary positions. The post 70 will be first described; this post is carried by an integral standard 80, Figs. 1 and 5, having a boss 81 projecting downwardly through a hole 82 in the base plate 10. About this boss as a pivot the post is swung to either of its two operating positions. It is to the boss 81 that the arm 51, previously described, is splined as seen in Fig. 5. A spring-pressed plunger 83 slides vertically in the standard 80 and may enter either of two holes in the base plate. The plunger is retractable by means of the handle 85 and may be retained in retracted position by the radial lugs 86 which are withdrawn from corresponding slots in the standard and ride upon the horizontal face 86—a when the handle is turned.

A pointer 87 is provided on the standard to register with suitable indicia, such as the inscribed buttons 88 and 89 on the base plate, to facilitate the correct placing of the post by the operator. The post may be swung outwardly past its outermost record-supporting position to allow the larger size records to be removed from the turntable.

The post 70 projects downwardly through an opening 84 and secured to the lower, squared end of the shaft 72, carrying the record supporting unit 73, is a short crank 90 below the base plate, as seen in Figs. 4 and 5. To this crank, at 91, is pivoted a link 92 which at its other end is pivoted, at 93, to one arm 94 of a bell crank 95. The bell crank is freely pivoted on a stud 96 mounted at the center of the boss 81. To a second arm 97 of the bell crank is pivoted, at 98, a link 99 which at its other end is pinned to a rocker arm 100. This rocker arm is rotatably mounted on a post 101 carried by the upper and lower frame plates 31 and 34, previously described, and its free end 102 extends into the path of a roller pin 103 on a disc 104 rigid with the shaft 25.

A spring 105, extending between the pivot pin 98 and one of the legs 33 of the frame member 31, normally keeps the rocker arm against the rubber bumper 106, and the plate 73 in stack supporting position. During rotation of the shaft 25, by the power take-off, the pin 103 approaches and engages the side face at one end 102 of the rocker arm and continued rotation rocks it about the post 101 in a clockwise direction as viewed in Figs. 4 and 9. This, through the linkage 90—99, rotates the shaft 72 to drop the record from the plate 73, as previously described. Upon further rotation of the shaft 25, the rocker arm rides off the pin 103 and the linkage 90—99 and the record supporting unit are restored by the spring 105.

The post 71 is provided with an identical stack supporting unit 73, shaft 72, crank 90, pivot 91, and link 92, as is the post 70. The link 92 is pivoted at 93 to an arm 107 of a bell crank 108 rotatably mounted on the stud 96 at the pivot point 81a of the standard 80a, which is diametrically opposite the boss 81 of the standard 80 and at an equal distance from the turntable spindle. The other arm 109 of the bell crank 108 is linked by the bar 110 with a third arm 111 of the bell crank 95. The two arms 109 and 111 are parallel and of equal length, and hence any rotation to the bell crank 95 imparts an equal rotation to the bell crank 108. Moreover, parallelism and equality of length are provided between the arms 94 and 107, the links 92—92, and the cranks 90—90, respectively. Thus the shafts 72 are given equal rotations by the rocker arm 100, and it is assured that the two units 73 will drop their respective portions of the record simultaneously so that it will not fall obliquely with the attendant noise and danger of breakage, or binding on the spindle, but will be cushioned by the air beneath as it falls smoothly into place.

Splined to the boss 81a of the standard 80a is an arm 112, below the base plate 10, and above the bell crank 108. A link 113 extends from the pivot pin 114 on the free end of the arm to a boss 115, Fig. 5, projecting downwardly from the standard 80 through an elongated opening 116 in the base plate. The lever arm of the boss 115 about the pivot at 81, and the lower arm of the pin 114 about the boss 81a, extend in the same direction and are parallel and of equal length, and thus the placing of the post 70, by the operator, at either of its two operating positions or at its clearance position, causes the post 71, through the linkage 112—115, to assume a corresponding position diametrically opposite it.

It is desirable, for most efficient operation, that the stack supporting units 73 have the relationship with the edge of the record for which they are designed regardless of the diameter of the record or of the swinging of the units about the pivots 81 and 81a. This condition is assumed if the angle A, Fig. 4, between the crank 90 and a line L drawn from the center of the shaft 72 to the turntable center, is preserved in shifting from one operating position to the other. To this end the point 93 at which the link 92 from the crank pivots on the bell crank 108 is so chosen as to be equi-distant from the two operating positions of the point 81, shown in full and broken lines in Fig. 4. This same geometrical relationship exists between the crank 90 of the post 70 and its respective bell crank 95 as has just been described in connection with the post 71 and bell crank 108.

In Fig. 11 the supporting unit is shown as it normally appears at its two operating positions. For clarity of the illustration the unit has been represented as stationary and the smaller sized record R1 has been moved toward it, instead of vice versa. It will be seen that the supporting unit stands in exactly the same relationship to the edge of both large and small records, R and R1, respectively.

Due to the angularity of the arms 94 and 107 with respect to a line between the shafts 72 and their respective pivots 81 and 81a, the cranks 90 will not be pulled through as great an angle at their inner positions as at their outer positions. This, however, is of no moment, since once the record has been dropped, continued rotation of the stack supporting units is ample to introduce a sufficiently firm support beneath the stack, as previously described, and illustrated in Fig. 12, where the ultimate position of the unit, when operating with smaller records R1, is shown in broken lines.

To cover what would otherwise be unsightly holes in the base plate 10, flat, integral wings 117 and 118 are formed on the standard 80 to line above the opening 116, and wings 119 and 120 are formed on both standards 80 and 80a to lie above the openings 84.

Coming now to the mechanism above the base plate 10, which initiates the power take-off to produce the movements previously described, it will be seen that the spindle 23 for the rubber-tired wheel 22 is embraced by a cam slot 131 in a rocker arm 130. At its right hand end 132, as viewed in Figs. 1 and 2, this slot is concentric about the rocker arm pivot 133 from the position shown in Fig. 2 in a counter-clockwise direction will thus move the wheel 22 outwardly against the turntable rim 21, as seen in Fig. 1, from which the wheel will derive the power to drive the shaft 25 by means of the speed reduction unit 24, as previously described.

The counter-clockwise movement of the arm 130 is derived from the turntable spindle. The block 16, previously mentioned, as keyed to the spindle, pivotally carries at 134 a cam plate 135 which normally rests on a rubber bumper 136 on the block at a point remote from the pivot 134. The upper surface of the plate 135 is formed, as at 137, as a cam. The plate revolves with the turntable spindle and in its normal lower position passes beneath a cam follower 138 formed on the rocker arm 130.

The cammed, upstanding flange 141 of an arm of a bell crank 142, pivoted on the base plate at 143, is normally held out of engagement with the cam plate 135 by means of a latch 144. When this latch is tripped, however, by means later described, the bell crank is rotated clockwise against the stop 145 by means of a spring 146. If the cam plate 135, at this time, is revolving past the flange 141 the flange will simply ride along its concentric outer edge 147 until it passes and the bell crank will then continue on to its stop 145.

Figure 7:
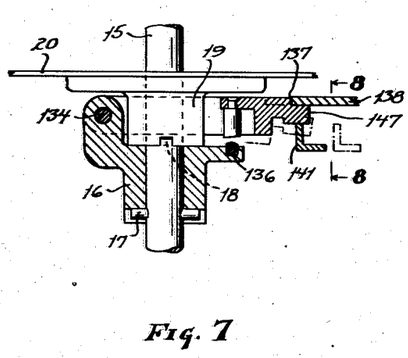
Fig. 7 is a fragmentary section taken on the line 7—7 of Fig. 2, with the parts in a slightly different relationship.
Figure 8:
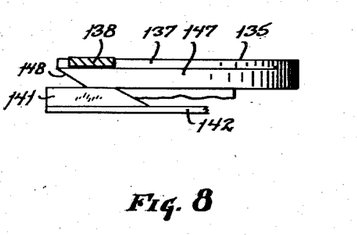
Fig. 8 is a section taken on the line 8—8 of Fig. 7.

The flange 141 now projects into the path of the cam plate, the lower surface of which is beveled as at 148, Fig. 8, and will therefore, at its next approach, ride up onto the flange. The parts are at this time in the position shown in Figs. 7 and 8 and the cam 137 has been raised to engage the cam follower 138. Continued rotation forces the cam follower outwardly, rocking the arm 130 to move the wheel 22 against the rim. Near the end of its travel, the rocker arm engages a pin 149 on the bell crank 142 which is thereby rocked counter-clockwise sufficiently to be reengaged by the latch 144, when the tripping means is later withdrawn, and the flange 141 is thus returned to idle position.

As the rocker arm 130 engages the wheel and rim, a lug 150 on the arm is caught by a latch 151 on an arm 152, Fig. 1. This arm is drivingly mounted on a rockshaft 153 journalled in the base plate. Also drivingly mounted on the rockshaft, below the base plate, is a cam follower 154. The disc 104, previously mentioned as carrying the roller pin 103, has formed on its periphery a single cam tooth 155. After the shaft 25 has been rotated to produce the tone arm movements and record changing, this tooth engages the follower 154, camming it outwardly against a spring 156. The latch 151 thus releases the lug 150 which is then caught by a second latch 157. During the attendant slight movement of the rocker arm 130, the wheel 22 is still held in driving engagement because of the concentric lull 132 in the cam slot.

Further driving of the shaft 25 releases the follower from the cam tooth 155 and the spring 156 returns the arm 152 against its bumper 158. The lug 150 is thereby released from the latch 157 and the rocker arm is swung to its idle position of Fig. 2, by the spring 140, and the wheel is withdrawn from the rim 21.

The tripping of the latch 144 initiates all the movements and operations so far described, excepting the manual adjustments, and is accomplished by the tone arm upon its arrival at a point, near the spindle, to which it has been swung by the playing groove G and its continuation as a run-in groove G2, Fig. 13. Secured to the hollow tone arm shaft 35 is a depending bell-shaped skirt 170 concealing the bearing of the shaft. Projecting laterally from this skirt and thus swinging with the tone arm 40 is an arm 171 pivotally carrying, at its free end, a rod 172 which extends beneath the turntable rim and adjacent the latch 144. A latch tripping finger 173, adjustably secured to the free end of the rod, is adapted to engage an upstanding ear 174 on the latch member, thus tripping it when the rod is pulled far enough by the arm 171. The rod 172 is yieldably and slidably held against a knife-edge 175, also on the latch member, by a light leaf spring 176, mounted on an upstanding ear on the base plate, and is slidably supported by the horizontal surface 177. The rod is provided, near its free end, with a series of latch teeth 178 which may be formed by circumferential grooves as seen in Fig. 3. As the needle and tone arm approach the conclusion of the playing groove these teeth reach the knife-edge 175 and slide over it one by one, due to the complementary bevels of the teeth and knife-edge. Any reverse movement, except as later explained, of the tone arm from then on will cause the rod 172 to reverse its direction and the knife-edge will be moved by the radial surface of a tooth to rock the latch member 144, about its pivot 179 and against the spring 180, in tripping direction.

The latch can thus be tripped by the tone arm in two different ways. A record having a run-in groove G2 will swing the tone arm far enough to engage the finger 173 and latch ear 174. A record without a run-in groove will allow the tone arm to travel to and fro after the needle leaves the playing groove and at its first reverse swing the knife-edge will be moved as just described.

The ear 174 is set slightly oblique to the path of the finger 173 and the end of the finger has a corresponding bevel 181. On engagement, therefore, the finger is urged to the right, Figs. 1 and 2, and pressure of the teeth on the knife-edge is relieved.

As stated, reverse movement of the tone arm trips the latch by means of the teeth 178. Therefore, during the swinging out of the tone arm by means of the power take-off, the rod 172 is held away from the knife-edge 175 by a pin 182 carried by the rocker arm 130, as seen in Fig. 1.

Figure 14:
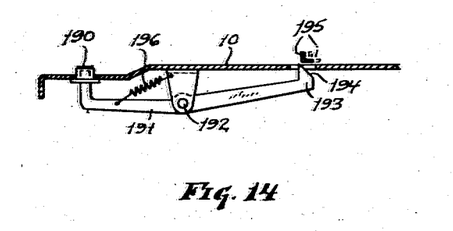
Fig. 14 is a section taken on the line 14—14 of Fig. 1.

A further means of tripping the latch is furnished by the manual starting button 190, projecting upwardly through an opening in the base plate and attached to a rocker arm 191 pivoted at 192 beneath the base plate Figs. 1 and 14. At its other end the arm 191 is bent upwardly at 193 to pass through a second opening in the base plate. Then the button 190 is pressed downwardly, a beveled surface 194 on the end 193 of the latch member 144 and cams it in the tripping direction. The rocker arm is normally held out of engagement by a spring 196.

A further means of disengaging the teeth on the rod 172 from the knife edge element 175 of the latch 144 is provided by the arm 201 rigidly affixed to the link 113, by thrust engagement of the upstanding projection 202 of said arm 201, laterally against the rod 172, by adjustment of the standard 80 to the position where the handle 85 carried by the post 80 may project into the aperture 203, Fig. 1, which is the proper adjusted position of the standard 80 for manual operation of the phonograph. Such an adjustment results in such advanced movement of the link 113 to the left, as viewed in Fig. 4, as to move the projection 202, as viewed in Fig. 2, to the right, and thereby deflect the rod 172 about its axis of possible rotation 204 against the power of the relatively weak spring 176. This will prevent any movement of the rod 172 laterally to effect engagement between its threads 205 and the latch tooth 175, and also will prevent any engagement between the tip 181 of the arm 173, on the free end of the rod 172, and the flange 174 of the latch 144, as previously described for automatic operation of the phonograph.

Thus, when the adjustable handle 85 is moved to manual position, where a lower projection registers with the position 203, the rod 172 is disabled from performing any of the operative functions required of it during automatic operation, when said handle is in either of the positions 88 or 89, Fig. 1.

The various elements of the mechanism having been described, a complete cycle of operation will now be briefly explained to coordinate their various functions. The records to be played having been chosen, the posts 70 and 71 are placed in the proper position, by means of the handle 86 and indicia 88—89, to accommodate the size of records being used. The records are then stacked upon the spindle so as to rest upon the posts. The motor 12 is started by means of a switch 200 at the front of the base plate, the tone arm being swung aside.

Three different conditions may prevail at the start, as follows: The lower take-off may be engaged from previous operation of the machine and the mechanism may have previously passed the record dropping operation in its cycle; the power take-off may be engaged and record dropping not yet reached; or the power take-off may be disengaged.

In the first case, the tone arm will be brought inwardly and lowered at what would ordinarily be the starting groove of a record. None being present, however, the arm remains where it is with the needle suspended beyond the rim of the turntable, which is of smaller diameter than the records. The operator presses the starting button 190 and the power take-off goes through its next cycle, this time dropping the bottom record from the stack onto the turntable, and the tone arm again swings inwardly and now engages the record.

In the second case, the record is dropped at once and the tone arm swings to engage it. The operator may have pressed the starting button, as a matter of usual procedure, but this is superfluous in this case and does nothing but rock the latch member 144, the bell crank 142 being held by contact of the rocker arm 130 with the pin 149.

In the third case, pressing the starting button engages the power take-off and the mechanism goes through its cycle, dropping the record and engaging it with the tone arm.

The record is now being played. Near the conclusion the tone arm has been swung inwardly far enough for the teeth 178 to engage the knife-edge and at the conclusion the needle leaves the playing groove, either to meander freely or to follow the run-in groove. In the first case the latch 144 is tripped by the teeth 178 and in the second by the finger 173. The arm 142 then swings into the path of the revolving cam plate 135, lifting it into engagement with the rocker arm 130 which is thereby swung to engage the power take-off at the turntable rim and is latched in this position by the arm 152. The tone arm is now raised from the record by the rocker arm 42 and is swung aside by the cam follower 48. The pin 103 engages the rocker arm 100 and causes the linkages below the base plate to rotate the stack supports 73 to drop the second record. The cam follower 60 now engages the appropriate cam 49 or 50 and returns the tone arm to the starting groove, to which it is lowered by the rocker arm 42 and rod 41, and which it is now free again to follow. The cam tooth 155 trips the latch arm 152 and disengages the power take-off.

The second record is now being played, and subsequent ones follow in the same manner until the stack is exhausted. After that the record supports 73 rotate idly and the tone arm returns to repeat the last record until the motor switch is finally opened. The supporting posts 70 and 71 are then moved outwardly and the accumulated records may be removed from the turntable.

Having thus described my invention in a single embodiment, I am aware that numerous and extensive departures may be made from the em- bodiment herein illustrated and described, but without departing from the spirit and scope of my invention.

I claim:

1. In a record changer of the type wherein lowermost records of a stack disposed substantially vertically above a phonograph turntable are periodically individually dropped therefrom on to a phonograph turntable, the combination of a plurality of rotatable posts positioned laterally of the stack, a pair of horizontally extending superposed relatively spaced record engaging blades carried by each of said posts, the lowermost of each pair of said blades adapted to be arcuately rotated to position its outer portion immediately below the lowermost record of the stack to support said stack of records, and to be arcuately rotated to another position laterally spaced from the periphery of said stack to release the lowermost record, the uppermost blade of each pair having a record engaging beveled outer edge portion of generally arcuate form, the outer edge portion thereof disposed relatively near its tip being more axially inwardly arcuately directed relative to the axis of blade rotation than the outer edge portion spaced more rearwardly from said tip, said tip portion of said blade overlying a trailing portion of the lower blade, and all of said record engaging outer beveled edge portion of said blade being disposed at an equal distance and at a greater distance from the axis of said blade rotation than the distance therefrom to the adjacent edge of the records of said stack and being arcuately curved in a forward direction towards said tip and sufficiently inwardly to slightly decrease the distance of said edge portions from said axis of blade rotation, and linkage means so interconnecting said posts, as to cause all of the uppermost posts to similarly rotate and similarly bring like peripheral portions of all of the blades in like relation to said stack of records, when any one of said posts is rotated, a phonograph reproducing tone arm adapted to traverse the upper surfaces of the uppermost record disposed on the phonograph turntable to reproduce said record, and automatic means operable responsive to the completion of a record reproduction movement of said tone arm inwardly of said upper record to move said tone arm outwardly from between said stack and the said uppermost record, and means actuated responsive to said outward movement of said arm, to simultaneously rotate all of said posts in such direction and to such angular extent as to remove each lowermost blade from supporting engagement with the lowermost record of the stack and concurrently to so move each uppermost blade as to cause it to penetrate between the two lowermost records of said stack, and means to subsequently reverse the direction of movement of said posts to restore said blades to their initial position, said upper blades being relatively thin and flexible, and means carried by said posts underlying said upper blade to support the shank portion of said upper blade against the bending stress imposed on the end of said upper blade, while temporarily supporting the said balance of the stack of records, said upper blade being free of restraint by said underlying supporting means against upward bending stresses imposed against the under side of the end portion of said upper blade resulting from upward camming action of the lowermost record of a stack during the previous penetrating movement of said upper blade.

2. In a record changer for an automatic phonograph comprising a turntable, said record changer being of the type wherein lowermost records of a stack disposed vertically above the said phonograph turntable are periodically dropped upon the turntable, the combination of oscillatable posts arranged adjacent said turntable, two blades on each of said posts for supporting a plurality of stacked records above the turntable, said blades having outer edge portions shiftable into and out of vertical alignment with border portions of the stacked records, and being arranged at two different levels and being angularly so positioned that said lowermost blade may normally extend from its supporting post to a position where its border portion underlies and supports the stack by engagement of the lower border surface of the lowermost record of the stack with all portions of the uppermost blade extending laterally from the post outwardly beyond the periphery of said stack, and whereby upon a predetermined rotational movement of said post, said uppermost blade is rotated to such angular extent as to cause its outer edge portion to penetrate between the two lowermost records of the stack, said blades being relatively angularly extended from said post that upon continued movement of said lowermost blade it will be rotated outwardly beyond the periphery of said stack after initial penetrating movement of said uppermost blade occurs, whereby the lowermost record of the stack will be vertically dropped therefrom with the balance of the records of the stack meanwhile supported upon the uppermost blade, the forward prow end portion of the uppermost blade overlapping the rearmost portion of the lowermost blade to such an extent that outer portions of at least one of said blades will at all times be extended within the periphery of the records of said stack whereby a single record is delivered to the turntable on each complete oscillation of the posts, means to simultaneously adjust all of said posts for effecting proper lateral initial positioning of all of said pairs of blades, for different sized records, comprising guiding links disposed below the turntable interconnecting the lower portions of said posts, and a graduated adjusting device for one of said posts comprising a fixed plate disposed adjacent said post and having spaced graduations thereon and an element of said post adapted to traverse said plate and to be positioned adjacent any of the graduations thereof whereby all of said posts are simultaneously correspondingly adjusted by adjustment of said device.

3. An automatic phonograph substantially as described in claim 2, the said combination characterized by a relatively upper one of said blades for each post being relatively thin and having a penetrating narrowed edge extending substantially eccentrically of its post axis and then inwardly with respect thereto near its forward free end, and adapted when its supporting post is rotated, to penetrate between the two lower records of the stack, said blades being so formed and so positioned by adjustment of said posts for records of the stack whereby said stack is initially supported on the relatively lower blade of each post, and whereby said posts when oscillated in the initial forward direction move the most laterally extended portion of each lowermost blade from engagement with the lower border surface of the lowermost record which is thereby released, and the said upper blade being concurrently rotated from an inoperative position to an operative position during which rotation the outer edge portions of the thin upper blade which are most laterally extended from its axis progressively enter and penetrate between the border portions of the two lowermost records, whereby after the lowermost record is released the remaining records are supported by said upper thin blade.

4. In a record changer for an automatic phonograph comprising a turntable, said record changer being of the type wherein lowermost records of a stack disposed vertically above the said phonograph turntable are periodically dropped upon the turntable, the combination of oscillatable posts arranged adjacent said turntable, swinging supports for said posts, two blades on each of said posts for supporting a stack of records above the turntable, said blades being laterally shiftable into relative overlapping engagement with peripheral portions of the lowermost pair of said records, and being arranged at two different levels and being angularly so positioned that said lowermost blade may normally extend from its supporting post to a position where its border portion underlies and supports the stack by engagement of the lower border surface of the lowermost record of the stack with all portions of the uppermost blade extending laterally from the post outwardly beyond the periphery of said stack, and whereby upon a predetermined rotational movement of said post, said uppermost blade is rotated to such angular extent as to cause its outer edge portion to penetrate between the two lowermost records of the stack, said blades being relatively angularly extended from said post that upon continued rotational movement of said lowermost blade it will be rotated outwardly beyond periphery of said stack after initial penetrating movement of said uppermost blade occurs, whereby the lowermost record of the stack will be vertically dropped therefrom with the balance of the records of the stack meanwhile supported upon the uppermost blade, the forward prow end portion of the uppermost blade overlapping the rearmost portion of the lowermost blade to such an extent that outer portions of at least one of said blades will at all times be extended within the periphery of the records of said stack whereby a single record is delivered to the turntable on each complete oscillation of the posts, means to adjust the initial position of said blades for standard records of a given diameter comprising guiding links disposed below the turntable interconnecting the lower portions of said posts, and manually adjustable means adapted to adjustably swing one of said post supports, whereby all of said posts are correspondingly swung to the same predetermined distance from the axis of said records, said distance being such as to correspondingly vary the distance of the oscillation axes of said blades to the axis of said stack.

5. An automatic phonograph substantially as described in claim 4, the said combination characterized by a relatively upper one of said blades for each post being relatively thin and flexible and having a penetrating narrowed edge extending substantially eccentrically of the post axes and then inwardly with respect thereto near its forward free end, and adapted when its supporting post is rotated, to penetrate between the two lower records of the stack, said blades being so formed and relatively so positioned by said adjustment of said posts for records of a given diameter in the stack whereby said stack is initially supported on the relatively lower of said blades of each post, and whereby said posts when oscillated in the initial forward direction move the lowermost blade from engagement with the lower border surface of the lowermost record which is thereby released, and the said upper blade being so formed and disposed that when concurrently rotated from an initial position to an operative position its outer edge portions progressively enter and penetrate between the border portions of the two lowermost records, whereby, during and after release of the lowermost record, the remaining records are supported by said upper thin blade, and means associated with each of said posts extending radially outwardly therefrom for a portion of the radial extent of said thin blade and making engagement with the lower surface of the shank of said uppermost thin blade to support the non-penetrating portion of said blade against undue yielding by weight of the records imposed upon it.

6. In a record changer for an automatic phonograph comprising a turntable, said record changer being of the type wherein lowermost records of a stack disposed vertically above the said phonograph turntable are periodically dropped upon the turntable, the combination of a plurality of spaced oscillatable posts arranged adjacent said turntable and extending vertically substantially above the level thereof, at least one of said posts being rotatably oscillatable, a pair of superposed spaced blades on an upper portion of said oscillatable post for supporting records in a stack above the turntable, said pair of blades adapted when their supporting post is oscillated, to swing on a common vertical axis and having laterally extended portions disposed substantially at opposite sides of said axis and said upper blade comprising a thin flexible outer tip extending substantially curvilinearly in the forward direction of post rotation, the end of said tip being so extended as to slightly overlap the lower blade, and the uppermost blade having a leading outer edge overlying the trailing outer edge of the lowermost blade, whereby when simultaneously swung one of said blades is removed from supporting engagement with a border portion of a lowermost record of the stack to release said lowermost record for gravitational descent onto the turntable while the other relatively upper of said blades moves into supporting contact with the border portion of the adjacent record of the stack to temporarily support the remaining records of the stack, pending retractive swinging movement of said blades whereby supporting contact of the stack by the lowermost of said blades is resumed, whereupon, upon a complete corresponding oscillation of said blades, a lowermost record of the stack is released to the turntable, and a support for said upper blade disposed laterally of the stack to prevent excessive flexing thereof when said blade supports said stack, and said upper blade being free of said support to flex upwardly when projected between a lowermost pair of records of a stack.

7. In a record changer for an automatic phonograph comprising a turntable, said record changer being of the type wherein lowermost records of a stack disposed vertically above the said phonograph turntable are periodically dropped upon the turntable, the combination of a plurality of spaced rotatably oscillatable posts arranged adjacent said turntable and extending vertically substantially above the level thereof, at least one of said posts being rotatably oscillatable, a pair of superposed spaced blades on each of said posts for supporting records in a stack above the turntable, means to simultaneously oscillate said posts, said pair of blades adapted when their supporting post is oscillated, to swing on a common vertical axis and having laterally extended portions disposed substantially at opposite sides of said axis and said upper blade comprising a thin flexible outer tip extending substantially curvilinearly in the forward direction of post rotation, the end of said tip being so extended as to slightly overlap the lower blade, and the uppermost blade having a leading outer edge overlying the trailing outer edge of the lowermost blade, whereby when simultaneously swung one of said blades is removed from supporting engagement with a border portion of a lowermost record of the stack to release said lowermost record for gravitational descent onto the turntable while the other relatively upper of said blades moves into supporting contact with the border portion of the adjacent record of the stack to temporarily support the remaining records of the stack, pending retractive swinging movement of said blades whereby supporting contact of the stack by the lowermost of said blades is resumed, whereupon, upon a complete corresponding oscillation of said blades, a lowermost record of the stack is released to the turntable, and a support for said upper blade disposed laterally of the stack to prevent excessive flexing thereof when said blade supports said stack, and said upper blade being free of said support to flex upwardly when projected between a lowermost pair of records of a stack.

8. An automatic phonograph substantially as described in claim 4, the said combination characterized by said links comprising direction changing levers and said links being so disposed and interconnected with said posts whereby and upon manual adjustment of an adjustable one of said posts, said linkage would transmit and so change the lateral direction of a different thereby moved post and the blades for each of said posts are correspondingly aligned relative to the adjacent peripheral edge portions of said lowermost records and with respect to lines extending between the axis of said stack and the axes of the different posts, in the different adjusted positions of said post supports, whereby the initial angle of contact between said blades and the peripheral edge of said records is substantially identical under conditions of said adjustment for records of different diameters.

9. In an automatic record changing mechanism of the class described, the combination with the record supporting turntable, a base supporting said turntable and underlying the same, a plurality of standards each extending upwardly from and pivotally supported on the base, and each provided at its free ends with a vertical upwardly extended tubular portion, a rotatable oscillatable post journaled in the tubular portion of each standard, a pair of record supporting and releasing blades carried by the upper end of each said post, said blades alternately engageable with the under sides of the respective two lower records of a stack of records thereby supported by said blades, whereby a lowermost of said records is consecutively discharged from the stack to the turntable by oscillating movement of said posts and linkage interconnecting said posts whereby swinging movement of one of said standards is correspondingly communicated to all of said standards and common adjustment means for all said posts associated with a controlling one of said standards, said adjustment means comprising releasably locking means for retaining said standards in any one of a plurality of swingingly adjusted positions.

LEE B. GREEN.